United States Patent
Chen

(10) Patent No.: US 8,831,814 B2
(45) Date of Patent: *Sep. 9, 2014

(54) ELECTRONIC DEVICE WITH VIRTUAL DISPLAY AND INPUT

(71) Applicant: Innova Electronics, Inc., Irvine, CA (US)

(72) Inventor: Ieon C. Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/892,488

(22) Filed: May 13, 2013

(65) Prior Publication Data

US 2013/0289820 A1 Oct. 31, 2013

Related U.S. Application Data

(63) Continuation of application No. 13/458,611, filed on Apr. 27, 2012, now Pat. No. 8,509,986.

(51) Int. Cl.
*G01M 17/00* (2006.01)
*G06F 3/033* (2013.01)
*G06F 3/02* (2006.01)
*G06F 7/00* (2006.01)
*G06F 17/00* (2006.01)
*G06F 3/042* (2006.01)
*G06F 3/01* (2006.01)

(52) U.S. Cl.
CPC ............... *G06F 17/00* (2013.01); *G01M 17/00* (2013.01); *G06F 3/0426* (2013.01); *G06F 3/017* (2013.01)
USPC .......... 701/29.1; 715/781; 345/168; 701/33.2

(58) Field of Classification Search
USPC .................. 701/29.1, 31.4; 345/168; 715/781
See application file for complete search history.

(56) References Cited

U.S. PATENT DOCUMENTS

| D334,560 S | 4/1993 | Wilson |
| 5,347,211 A | 9/1994 | Jakubowski |
| D377,622 S | 1/1997 | Chen |

(Continued)

OTHER PUBLICATIONS

I. Tech Virtual Keyboard, Laser Virtual Keyboard, Virtual Laser Keyboard [info sheet], www.vkb-support.com/learn_more.php/, Golan Technology VKB Distributor in U.S. and Canada.

*Primary Examiner* — Thomas G Black
*Assistant Examiner* — Tyler Paige
(74) *Attorney, Agent, or Firm* — Stetina Brunda Garred & Brucker

(57) ABSTRACT

Provided is an automotive diagnostic tool including a tool body and a first projector connected to the tool body. The first projector is configured to project a diagnostic display image onto an adjacent surface separate from the tool body. An input detection sensor is connected to the tool body and is configured to detect motions of a user within a field of view proximate the tool body, and to generate an input signal responsive to the detected motions. A diagnostic processing unit is disposed within the tool body and is connected to the first projector and the input detection sensor for receiving the input signal therefrom. The diagnostic processing unit is configured to be operatively connectable with the onboard vehicle computer to receive vehicle data therefrom and to process the data and modify the diagnostic display image according to the received vehicle data and the input signal.

21 Claims, 3 Drawing Sheets

(56) References Cited

U.S. PATENT DOCUMENTS

| | | |
|---|---|---|
| 5,635,841 A | 6/1997 | Taylor |
| 5,758,300 A | 5/1998 | Abe |
| 5,767,681 A | 6/1998 | Huang |
| 5,809,437 A | 9/1998 | Breed |
| 5,859,628 A | 1/1999 | Ross et al. |
| 5,884,202 A | 3/1999 | Arjomand |
| 6,000,413 A | 12/1999 | Chen |
| 6,055,468 A | 4/2000 | Kaman et al. |
| 6,094,609 A | 7/2000 | Arjomand |
| 6,169,943 B1 | 1/2001 | Simon et al. |
| 6,225,898 B1 | 5/2001 | Kamiya et al. |
| 6,263,268 B1 | 7/2001 | Nathanson |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothschink |
| 6,587,768 B2 | 7/2003 | Chene et al. |
| 6,611,740 B2 | 8/2003 | Lowrey et al. |
| 6,650,318 B1 | 11/2003 | Arnon |
| 6,732,031 B1 | 5/2004 | Lowrey et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,301,329 B2 | 10/2012 | Andreasen |
| 8,306,687 B2 * | 11/2012 | Chen ............................ 701/31.5 |
| 8,370,018 B2 | 2/2013 | Andreasen et al. |
| 8,509,986 B1 * | 8/2013 | Chen ............................ 701/31.4 |
| 2003/0171111 A1 | 9/2003 | Clark |
| 2004/0110472 A1 | 6/2004 | Witkowski |
| 2006/0232558 A1 | 10/2006 | Chien |
| 2008/0004764 A1 | 1/2008 | Chinnadurai |
| 2008/0119981 A1 | 5/2008 | Chen |
| 2008/0249681 A1 | 10/2008 | Bertosa |
| 2008/0297614 A1 | 12/2008 | Lieberman et al. |
| 2009/0276115 A1 | 11/2009 | Chen |
| 2011/0224866 A1 | 9/2011 | Chen |
| 2011/0264322 A1 | 10/2011 | Chen |
| 2012/0010775 A1 | 1/2012 | Chenn |
| 2012/0215398 A1 * | 8/2012 | Chen et al. .................. 701/31.6 |
| 2013/0204485 A1 * | 8/2013 | Chen et al. .................. 701/29.6 |

* cited by examiner

ELECTRONIC DEVICE WITH VIRTUAL DISPLAY AND INPUT

CROSS-REFERENCE TO RELATED APPLICATIONS

The present application is a continuation application of U.S. application Ser. No. 13/458.611, filed Apr. 27, 2012, the contents of which are expressly incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to a virtual user interface, and more specifically to a virtual user interface for an automotive diagnostic tool, including a projection device for displaying data on an adjacent surface external to the diagnostic tool and a virtual user input for detecting user input gestures.

2. Description of the Related Art

It is well known that computers and other electronic modules have been increasingly incorporated into automobiles. Accordingly, during operation of a recently manufactured vehicle, electronic data is generated, collected and stored within a computer(s) located on the vehicle. The data may be retrieved by an automotive diagnostic tool, which is configured to operatively connect with the vehicle's computer and download the data therefrom. The data retrieved from the vehicle may include diagnostic trouble codes (DTC), freeze frame data, live data, etc. Once the data is retrieved, the data may be processed to determine the diagnostic health of the vehicle.

Most automotive diagnostic tools include a built-in display screen which displays images during operation of the tool. The display screen may display the operating conditions of the tool (such as whether the tool is connected to the vehicle), diagnostic data (such as DTCs), possible repair solutions, or the like. Thus, the display screen is an integral component of most automotive diagnostic tools.

Although built-in display screens provide suitable depiction of the functions and data commonly associated with operating the automotive diagnostic tool, conventional displays suffer from some deficiencies. One significant deficiency associated with conventional displays is the cost of the displays. In particular, the display is oftentimes the most expensive component on conventional automotive scan tools. Therefore, if alternate display mechanisms were available, the manufacturing cost of the tools would decrease, thereby reducing the overall cost to the automotive diagnostic tool.

Another deficiency commonly associated with conventional built-in displays is that they have a fixed size, which is dictated by the size of the automotive diagnostic tool, i.e., the built-in display screen is typically set within the automotive diagnostic tool. Thus, built-in display screens tend to be small, particularly in hand held automotive diagnostic tools. Therefore, it is difficult for multiple people to observe images on a small, built-in display screen. Furthermore, due to the relatively small nature of the built-in display screens, there is a limited amount of content that the conventional display screens can show. Therefore, the user may be required to navigate through several different screens to view information which may otherwise be displayed on a single, larger screen.

Although in some situations it is beneficial to minimize the user input on diagnostic tools to provide ease of use, in other situations, it may be desirable to provide additional input options. For instance, a more sophisticated user input may allow a user to enter more information, which would enhance the diagnostic process and may simplify the use of the automotive diagnostic tool in certain circumstances. However, it may be difficult to incorporate additional input options a handheld automotive diagnostic tool because of the limited space available on the tool.

Therefore, there is a need in the art for an improved user interface including a more cost effective and adaptable display device, and a user input that provides the user with enhanced resources to allow for more simplified and thorough user input.

BRIEF SUMMARY OF THE INVENTION

The present invention specifically addresses and alleviates the above-identified deficiencies in the art. There is provided an automotive diagnostic tool including a virtual user interface including a projection display and a virtual user input. The projection display projects an image onto an adjacent surface to display diagnostic information to the user. The projection display is not constrained by the size or form factor of the host diagnostic tool (in contrast to conventional built-in display screens), but instead utilizes adjacent surfaces external to the automotive diagnostic tool as a "projection screen" upon which an image is projected for display to the user.

The virtual user input provides a unique means by which the user may input information into the automotive diagnostic tool during use thereof. In particular, the virtual user input is configured to detect input gestures made by the user and convert the input gestures into input signals. The input gestures may be performed without the user physically engaging or contacting the tool. Thus, the virtual user input is not constrained by the physical dimension of the automotive diagnostic tool, and instead, may provide for more comprehensive and thorough input by the user, which results in an easier-to-use tool with greater capabilities.

According to one embodiment, the automotive diagnostic tool includes a tool body and a first projector connected to the tool body. The first projector is configured to project a diagnostic display image onto an adjacent surface separate from the tool body. An input detection sensor is connected to the tool body and is configured to detect motions of a user within a field of view proximate the tool body, and to generate an input signal responsive to the detected motions. A diagnostic processing unit is disposed within the tool body and is connected to the first projector and the input detection sensor for receiving the input signal therefrom. The diagnostic processing unit is configured to be operatively connectable with the onboard vehicle computer to receive vehicle data therefrom and to process the data and modify the diagnostic display image according to the received vehicle data and the input signal.

The automotive diagnostic tool may additionally include a second projector connected to the tool body and configured to project an input template within the field of view. The first projector and the second projector may be configured to project the input template and the diagnostic display image in spaced relation to each other. The input template may include an image of a keypad having a first button and a second button.

The tool may include a position correlation module in communication with the input detection sensor and configured to correlate the first button with a first position coordinate and the second button with a second position coordinate. The user input signal may include information related to the first button when the input detection sensor detects the user at the first position coordinate and the user input signal including information related to the second button when the input detection sensor detects the user at the second position coordinate.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
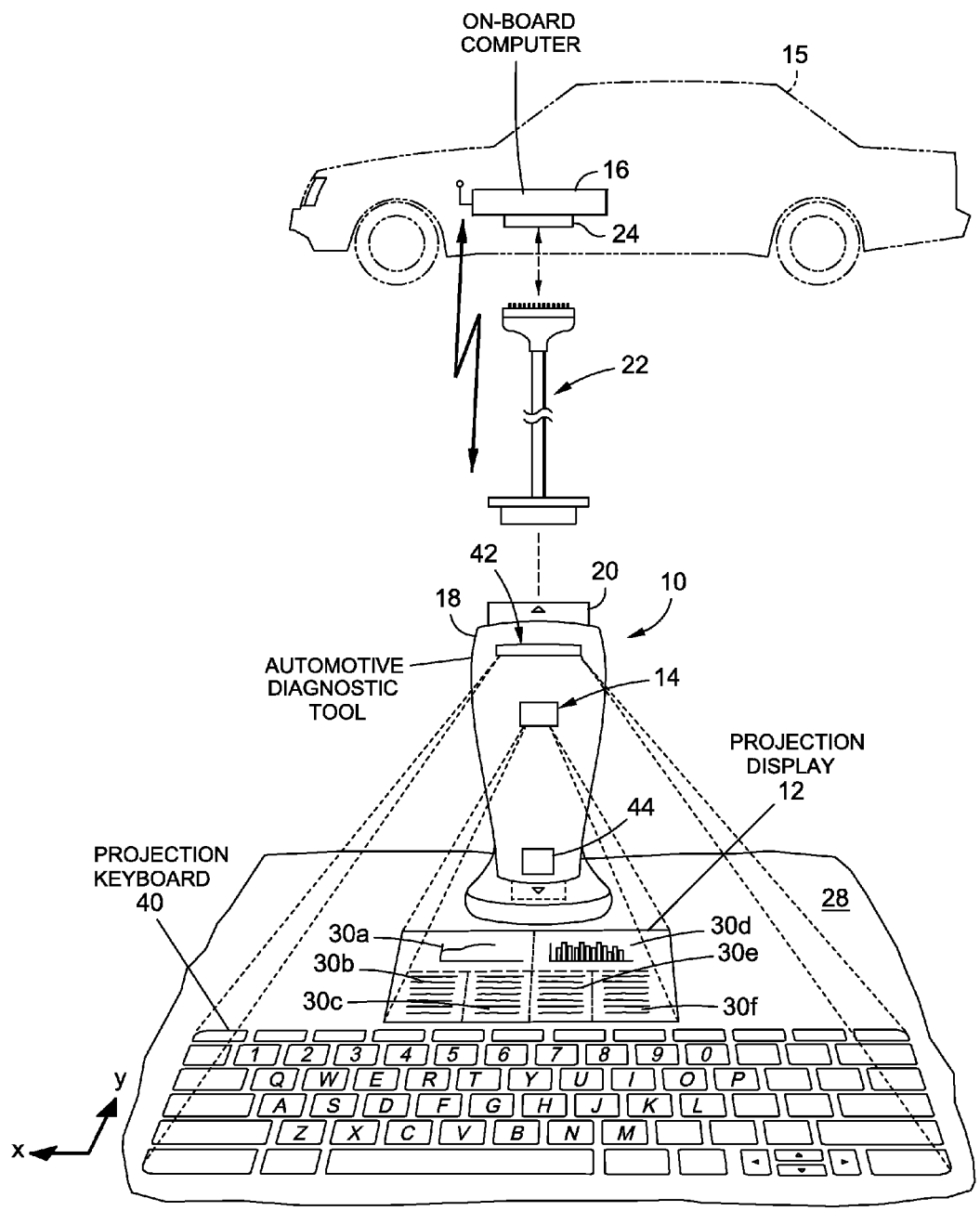
FIG. 1 is an upper perspective view of an automotive diagnostic tool having a virtual user interface including a projection display and a virtual user input.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and not for the purposes of limiting the same, there is shown a handheld electronic device 10, such as an automotive diagnostic tool, having a virtual user interface including a projection display and a virtual user input. The virtual user interface allows the handheld device 10 to display data in a remote projection field 12 and detect user input gestures performed in spaced relation to the handheld device. The projection display includes a projector 14 which serves an alternative to conventional built-in display screens such as an LCD or LED type display screen. The projector 14 may be implemented into the handheld device 10 at a reduced cost and may provide more versatility than conventional display systems. Furthermore, the virtual user input provides a complementary input system to the projection display and allows the user to communicate with the device 10 and enter user input into the device 10 without physically touching or contacting the device 10. In view of the remote nature of the display and input systems associated with the virtual user interface, the display and input system are not constrained by the physical form factor of the device 10. Thus, the projection display and virtual user input may be larger and easier to use than the display and input systems on conventional electronic devices.

Referring now specifically to FIG. 1, an embodiment of the device 10 is shown as an automotive diagnostic tool configured for use a vehicle 15 having an onboard computer (i.e. data generator) 16 for generating and storing data during operation of the vehicle 15. The onboard computer may include a single computer or several computers/sensors/electronic modules located throughout the vehicle. The computer 16 includes a vehicle connector 24 for accessing, the data in the computer 16.

FIG. 1 additionally shows an automotive diagnostic tool 10 including a tool body 18 and a tool connector 20. The automotive diagnostic tool 10 may be similar to conventional code readers, scan tools, or the like, and may be configured to interface with a vehicle computer 16 to retrieve data therefrom. In this regard, the automotive diagnostic tool 10 may be capable of communicating with the vehicle computer 16 in an OBD-II protocol or other protocols known in the art. The tool connector 20 is configured to be operatively engageable with the vehicle connector 24 for placing the tool 10 in communication with the vehicle computer 16. The tool 10 may be connected to the on-board computer 16 via wired or wireless communication means. The exemplary embodiment shows a cable connector 22 disposed between the tool connector 20 and a computer connector 24 to facilitate wired data transfer between the on-board computer 16 and the tool 10. Wireless communication between the computer 16 and the tool 10 by means of wireless technology, such as Bluetooth®, RF, infrared, or other wireless technologies known by those skilled in the art.

Data received by the tool 10 is communicated to a diagnostic processing unit, such as CPU 26 (see FIG. 2) or microprocessor located within the tool body 18. The data retrieved from the vehicle computer 16 may include graphical data and/or text data, such as diagnostic trouble codes (DTCs), DTC definitions, I/M monitor status, emission status warning lights, malfunction indicator lamp (MIL) status, live data, freeze frame data, etc. The data may be analyzed locally within the tool 10 or externally by remote diagnostic databases. For instance, the user may simply request a listing of DTCs retrieved from the vehicle. In that case, all of the processing may be performed locally by the tool 10. In addition, the tool 10 may be able to perform basic functionalities, such as determining the most likely problem associated with a particular DTC. However, for a more comprehensive analysis, the tool 10 may upload the data to a remote diagnostic database for further diagnostic processing. The tool 10 may receive a diagnostic summary from the remote database indicating the most likely problem with the vehicle and the most likely solution for correcting the most likely problem. For more details on the remote diagnostic process, see U.S. Patent Application Publication No. 2010/0174446, entitled, Automotive Diagnostic Process, and U.S. Pat. No. 8,068,951, entitled Vehicle Diagnostic System, both of which are owned by Innova Electronics Corp., which also owns the present application, the contents of which are incorporated herein by reference. The tool 10 may include a transceiver 25 for facilitating communication with the remote database or other remote locations. The transceiver 25 may be capable of communicating with the remote database via wireless or wired communication means.

Although the exemplary embodiment of the present invention includes the automotive diagnostic tool 10, as noted above, various aspects of the present invention include other handheld electronic devices which display information, including cell phones, tablet computers, personal digital assistants, etc. Therefore, although the exemplary automotive diagnostic tool 10 receive a data from a vehicle, it is contemplated that other embodiments of the present invention may receive data from other external resources to display other types of images/information. For instance, data may be received from the Internet, cellular communication networks, local networks, etc.

After the data processing is complete, the CPU 26 generates a diagnostic display signal which corresponds to the underlying data received from the on-board computer 16. For instance, the display signal may correspond directly to the data retrieved from the vehicle, such as the listing to DTCs, live data, freeze frame data, etc., or the display signal may correspond to the diagnostic summary received from a remote database and include the most likely solution, the most likely fix, repair solutions, repair procedures, repair costs, local repair shops, etc. The CPU may also be capable of generating non-diagnostic display signals for displaying graphical data and/or text data by the projector 14. For instance, the non-diagnostic display signals may correspond to the start-up sequence, shut-down sequence, and other diagnostic or non-diagnostic images.

The CPU 26 is in communication with the diagnostic display projector 14 and communicates the display signal(s) thereto. The diagnostic display projector 14 is configured to receive the display signal and generate a projection which may be directed onto an adjacent surface 28 for viewing by the user. As used herein, the term "adjacent surface" upon which the image is displayed may be a wall, floor, desktop, tabletop, a surface of the vehicle, or other surfaces contemplated by those skilled in the art. The adjacent surface 28 is not part of the tool 10, and as such, the tool 10 does not employ a built in display screen for displaying the information to the user. Instead, the image is projected onto the adjacent surface 28 to allow the user to observe the image. In this regard, the adjacent surface 28 acts as a conventional "projection screen," wherein light from the diagnostic display projector 14 is directed toward the adjacent surface 28 and is reflected off of the adjacent surface 28 toward the user. The image projected onto the adjacent surface 28 may have to be focused or otherwise adjusted for optimal viewing by the user. In this regard, the display projector 14 may have brightness adjustment options, focus adjustment options, color adjustment options (i.e., black/white or color), or other image options known in the art.

Since the image is projected onto an adjacent surface 28, the size of the projection field 12 is not necessarily limited by the size of the tool 10. For instance, the tool 10 may be a compact, hand held diagnostic tool 10, yet the size of the projection field 12 may be much larger than the size of the tool 10. Thus, the image projection system provides a more user friendly display than smaller, built-in display screens.

The image projected by the display projector 14 may be a static image, i.e. the information does not change (such as a listing of DTCs), or a dynamic image, i.e. varying information (such as live data from the vehicle). Furthermore, the image may be segregated into several display portions which display different types of data or images. In the exemplary display field 12 depicted in FIG. 1 the image includes display portions 30*a-f*, wherein each display portions 30*a-f* may display different data to the user. For instance, display portion 30*a* depicts a line graph, while portion 30*d* depicts a bar graph, and portions 30*b*, 30*c*, 30*e*, and 30*f* display text. In this regard, the diagnostic display projector 14 includes the capability of generating an image that is sufficiently detailed to display the type of information that is commonly displayed in conventional diagnostic tools or other electronic devices. For instance, the projector 14 may be capable of projecting images commonly displayed on cell phones, tablet computers, such as "app" related images, maps, video games, videos, voice calls, etc.

Figure 2:
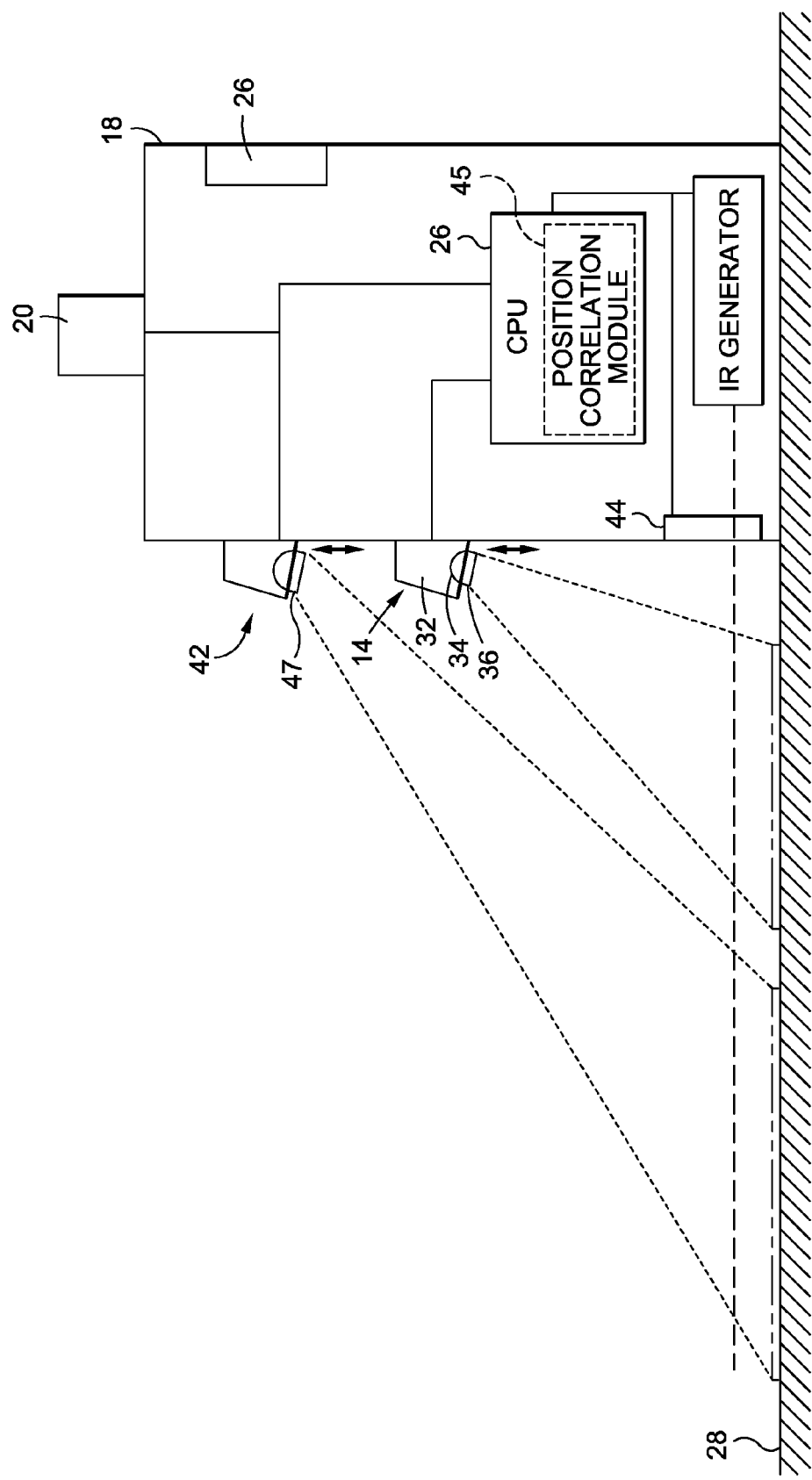
FIG. 2 is a schematic view of the automotive diagnostic tool depicted in FIG. 1.

Referring now specifically to FIG. 2, the diagnostic display projector 14 may include a projector housing 32 and a light element 34 connected to the projector housing 32, wherein the light element 34 emits the light which creates the display image. The light element 34 may be configured to generate an image having a brightness intensity large enough to project onto the adjacent surface 28.

According to one embodiment, the projector housing 32 is selectively pivotable relative to the tool body 18 to allow for selective pivotal adjustment of the image onto the adjacent surface 28. The pivotal movement of the projector housing 32 relative to the tool body 18 allows the user to direct the image onto the most convenient portion of the adjacent surface 28. There may be a more desirable portion of the adjacent surface 28 on which the image may be projected. For example, in the case of a desktop, a portion of the desktop may be covered by a computer, a keyboard, etc., while only a portion of the desktop remains exposed and thus defines a preferred image projection surface. The user may selectively pivot the projector housing 32 relative to the base portion to direct the image onto the exposed surface of the desktop to provide a clearer projection of the image.

In addition to adjusting the location of the image, the display projector 14 may additionally include a focusing lens 36 configured to adjust the size of the image by making the image larger or smaller. Therefore, the virtual display associated with the tool 10 is extremely versatile by allowing a user to selectively choose where the image is projected and how big the image will be. This type of versatility is not found in conventional built-in display screens on traditional automotive diagnostic tools.

The virtual user interface of the automotive diagnostic tool 10 additionally includes a virtual user input system that allows the user to make input gestures in spaced relation to the tool 10 to navigate through the information and screens projected by the tool as well as to select or input data into the tool 10. Therefore, the virtual user input is configured to identify the input gestures and generate corresponding input signals.

In one embodiment, the user's gestures are detected by an input detection sensor 44 connected to the tool body 18. The input detection sensor 44 may detect gestures made by the user in space, such as waving a hand or clapping hands, or alternatively, gestures made against a surface, such as tapping a finger on the surface or moving a finger on the surface. In this regard, the gestures made by the user and detected by the input detection sensor 44 may be correlated by the position correlation module 45. For instance, if the user is viewing a particular screen and wants to advance to the next screen, the user may wave his hand toward the input detection sensor 44, almost as if to "push" the current screen out of view. Furthermore, if the user wants to select a highlighted item, the user may tap the surface 28 adjacent the input detection sensor 44, similar to a "double-click" on a conventional computer mouse. Thus, the input detection sensor 44 may allow the user to make basic input commands without being constrained by a physical input device.

For more complex user input, the virtual user input may projects an input template 40 onto the surface 28 to guide the user for making gestures which are detectable by the virtual user input. The input template 40 may be as simple as a single button or may be more sophisticated and include a traditional keypad, also known as a QWERTY pad. The virtual user input is configured to correlate the virtual "buttons" projected onto the surface 28 with a physical location such that when the user is detected in that physical location, the virtual user input generates an input signal associated with that button. In this regard, a coordinate system may be used to define the respective virtual buttons for inputs incorporated into the virtual user input. For instance, the "A" button may be associated with the position X1, Y1, and the "S" button may be associated with the position X2, Y1, and so forth for the remaining buttons. Therefore, when the user's finger is located at position X1, Y1, the virtual user input detects the user's presents at that position and generates an input signal corresponding to the "A" button.

According to one embodiment, the virtual user input includes an input projector 42. In the exemplary embodiment depicted in FIG. 2, the input detection sensor 44 and input projector 42 are connected via the CPU 26. The input projector 42 projects the input template 40 onto the surface 28 and the input detection sensor 44 detects input movements or gestures by the user corresponding to selection of button(s) on the input template 40. The input projector 42 may be pivotable relative to the tool body 18, and may include a lens 47 for focusing the template 40 on the surface 28.

The CPU 26 may be programmed with a coordinate system corresponding to the layout of the input template 40 so as to generate an input template signal corresponding to the positional layout of the template to the input projector 42. Therefore, if the tool 10 is capable of projecting several templates 40, the CPU 26 may have several different coordinate systems program therein, and thus, may be capable of generating and communicating several different input template signals to the input projector 42. For additional information regarding a virtual user input, please refer to U.S. Pat. No. 6,650,318 entitled, Data Input Device, the contents of which are expressly incorporated herein by reference.

Figure 1A:
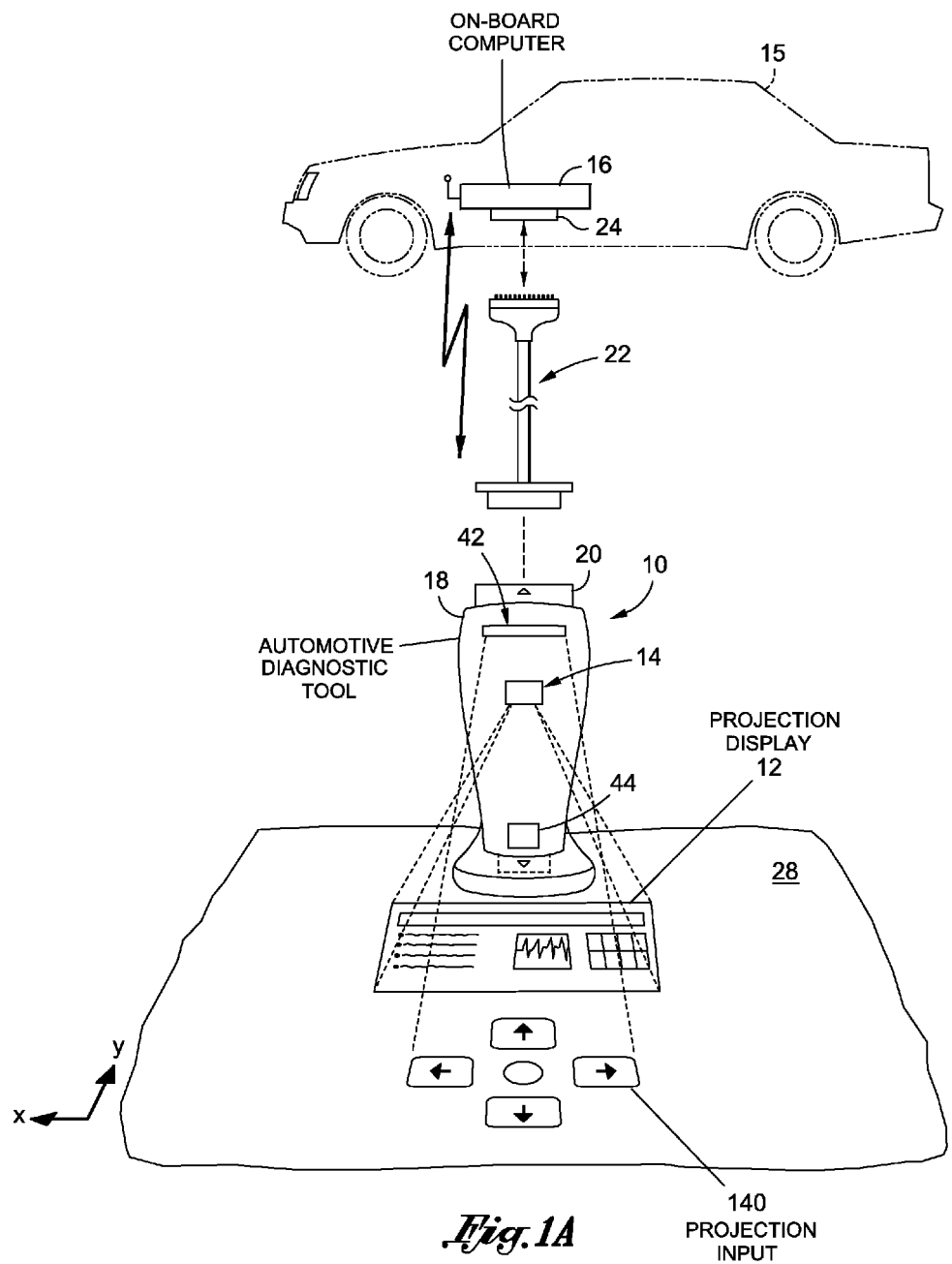
FIG. 1A is an upper perspective view of the automotive diagnostic tool shown in FIG. 1, wherein the virtual user input image is different from the virtual user input image displayed in FIG. 1.

It is contemplated that as the user sequences through the menus or screens projected by the tool 10, the input template 40 projected by the input projector 42 may change. In this regard, there may be specific input templates associated with specific display screens or modes projected by the tool 10. For instance, upon the initial start up of the tool 10, the user may navigate through scroll down menus to select the year, make, and model of the vehicle. However, at a later time, the user may be asked to type in their address to determine local repair shops. Thus, the input template associated with the initial screen, i.e. navigating through a scroll down menu, may include arrows to make the appropriate selection, such as the input template 140 shown in FIG. 1A. However, the input template associated with a more open ended inquiry, such as the user address, may display a QWERTY pad, such as the input template 40 shown in FIG. 1.

The input projector 42 may include a laser projection system, or other projection systems known by those skilled in the art. The projector 42 may be capable of displaying the input template 40 with a level of clarity needed for complex templates 40, such as a QWERTY pad.

The input detection sensor 44 may employ any position detection means known by those skilled in the art. In the exemplary embodiment, the input detection sensor 44 employs infrared technology to generate an infrared plane of light slightly above and generally parallel to the surface 28. The infrared light is invisible to the user and may be spaced only a few millimeters above the surface 28. When a user touches a position on the surface 28, infrared light is reflected in the vicinity of the key and is directed toward the input detection sensor 44. The detection sensor 44 then makes a real-time determination of the location of the reflected light and communicates that position to a position correlation module 45, which maps that location back to the input template 44 to generate an input detection signal. In the exemplary embodiment depicted in FIG. 2, the position correlation module 45 is shown as being integrated as part of the CPU 26, although those skilled in the art will readily appreciate that the position correlation module 45 may also be integrated into the detection sensor 44, or alternatively placed at other locations within the tool 10. The processing capabilities of the input detection sensor 44, the position correlation module 45 and the CPU 26 may be capable of detecting multiple reflection events simultaneously and thus can detect multiple key strokes at once.

In FIG. 1, the input template 40 is spaced from the projection field 12 of the primary display. However, it is understood that in other embodiments, the virtual user interface may be more like a touch screen, wherein the user makes selections within the projection field 12 that are detected by the input detection sensor 44. As such, the user may make selections by tapping or double tapping on particular areas of the projection field 12.

The virtual user input described above provides significant versatility and flexibility relative to more conventional built in user input devices on conventional diagnostic tools. For instance, conventional tools may have a limited number of input buttons built in the tool, which may significantly limit the user navigation or user input into the tool. The virtual user input allows a user to make simple selections such as navigating through a scroll down menu, to more complicated actions such as typing their address using a conventional QWERTY pad. Further, because the tool 10 is formed to be self supporting, i.e. to stand, unsupported, on the surface 28, the user is able to use one or both hands to interact with the virtual keyboard or other display that may be projected onto the surface. Therefore, the overall ease of use of tool 10 is enhanced while at the same time broadening the amount of input which may be received by the tool 10.

Although the exemplary embodiment shown in the figures and described above includes a virtual display system and a virtual input system, those skilled in the art will readily appreciate that other embodiments may include one system without the other. More specifically, one embodiment may include the virtual display system without the virtual input system, while another embodiment may include the virtual input system without the virtual display system.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. An electronic device configured for use with a data generator, the electronic device comprising;
    a body;
    a first projector connected to the body configured to project a display image onto an adjacent surface separate from the body;
    an input detection sensor connected to the body and configured to detect motions of a user within a field of view proximate the body, and to generate an input signal responsive to the detected motions; and
    a processing unit disposed within the body and connected to the first projector and the input detection sensor for receiving the input signal therefrom, the processing unit being configured to be operatively connectable with the data generator to receive data therefrom and to process the data and modify the display image according to the received data and the input signal.

2. The electronic device recited in claim 1, further comprising, a second projector connected to the body and configured to project an input template into the field of view.

3. The electronic device recited in claim 2, wherein the first and second projectors are configured to project the input template and the display image, respectively, in spaced relation to each other.

4. The electronic device recited in claim 2, wherein the first and second projectors are configured to project the input template and the display image respectively, adjacent each other.

5. The electronic device recited in claim 2, wherein the input template includes a keypad image, the keypad image having a first button and a second button.

6. The electronic device recited in claim 5, further comprising a position correlation module in communication with the input detection sensor and configured to correlate the position of the first button with a first position coordinate and the position of the second button with a second position coordinate, the input signal including information related to the first button when the input detection sensor detects the user in the first position coordinate and the input signal including information related to the second button when the input detection sensor detects the user the second position coordinate.

7. The electronic device recited in claim 6, wherein the position correlation module is integrated into the processing unit.

8. The electronic device recited in claim 2, wherein the second projector is configured to modify the input template in response to changes in the display image.

9. The electronic device recited in claim 8, wherein the second projector is configured to modify the input template as the user sequences through several display images.

10. The electronic device recited in claim 1, wherein the first projector is configured to project an input template onto an adjacent surface within the field of view.

11. The electronic device recited in claim 1, wherein the input detection sensor is an infrared detection sensor.

12. The electronic device recited in claim 1, wherein the first projector is selectively moveable relative to the tool body to facilitate selective placement of the display image.

13. The electronic device recited in claim 1, wherein the processing unit is configured to modify the display image in response to receipt of the data from the data generator.

14. A handheld electronic device configured for use with a computer, the electronic device comprising:
a body;
a processing unit disposed within the body and configured to be operatively connectable with the computer to receive data therefrom and to process the data and generate a display signal; and
a display projector connected to the body and in communication with the processing unit, the projector being configured to project a display image in response to the display signal on an adjacent surface separate from the body.

15. The handheld electronic device recited in claim 14, wherein the display projector is selectively moveable relative to the body to allow for selective placement of the display image.

16. The handheld electronic device recited in claim 14, wherein the processing unit is configured to generate the display signal in response to receipt of the data.

17. The handheld electronic device recited in claim 14, wherein the display projector is configured to receive a user input signal and modify the display image to include an image correlated to the user input signal.

18. A handheld electronic tool configured for use with a data generator, the handheld electronic tool comprising;
a tool body;
a input detection sensor connected to the tool body and configured to detect motions of a user relative to the tool body to generate an input signal; and
a processing unit disposed within the tool body and connected to the input detection sensor for receiving the input signal therefrom, the processing unit being configured to be operatively connectable with the data generator to receive data therefrom and to process the data and generate a display signal associated with the data and the input signal.

19. The handheld electronic tool recited in claim 18, further comprising an input display projector connected to the tool body and configured to project an input template onto an adjacent surface separate from the tool body.

20. The handheld electronic tool recited in claim 19, wherein the input template includes a keypad image, the keypad image having a first button and a second button.

21. The handheld electronic tool recited in claim 20, wherein the processing unit correlates the position of the first button with a first position coordinate and the position of the second button with a second position coordinate, the user input signal including information related to the first button when the input detection sensor detects the user at the first position coordinate and the user input signal including information related to the second button when the input detection sensor detects the user at the second position coordinate.

* * * * *